(No Model.)
F. J. GAY.
CUTTER FOR GEAR WHEELS.
No. 511,607. Patented Dec. 26, 1893.
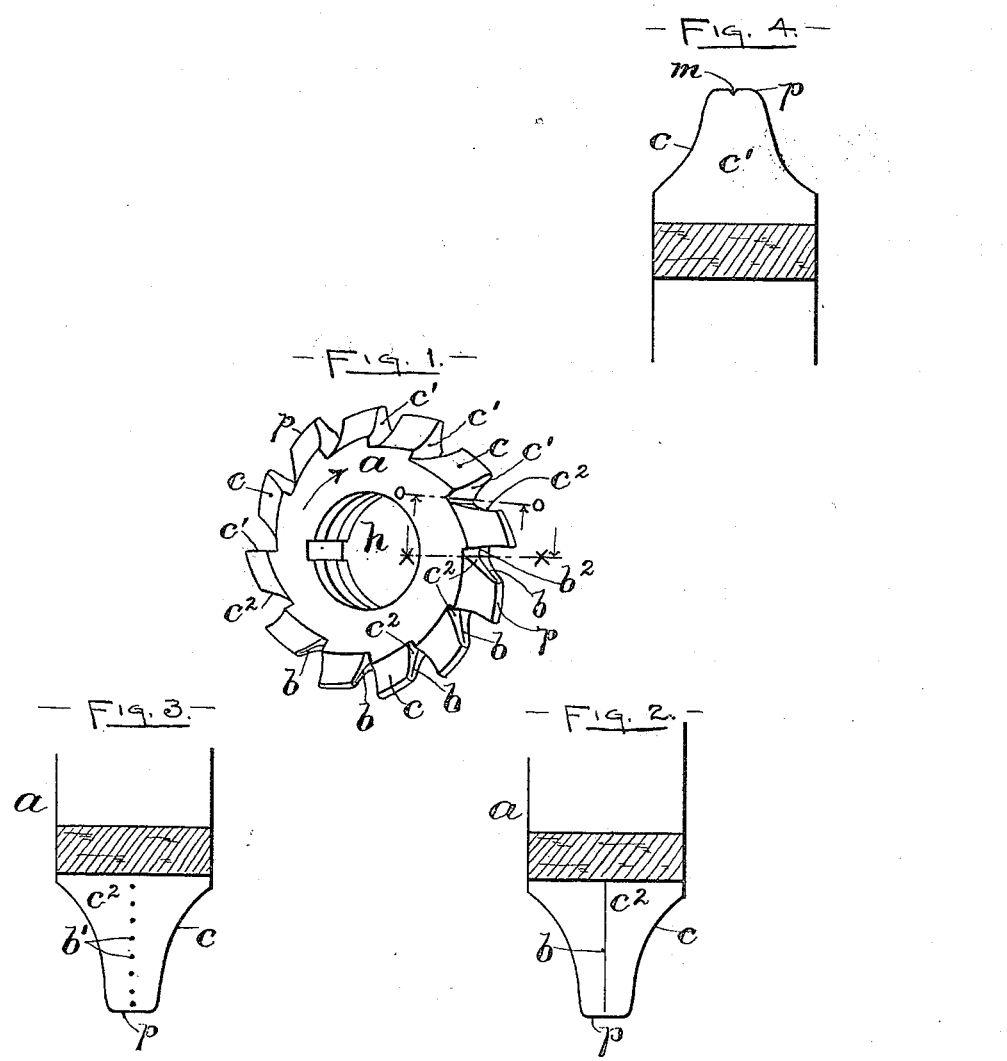
WITNESSES.
Fred Arnold,
Ida M. Warren.
INVENTOR.
Francis J. Gay.
by Remington & Henthorn
Att'ys.

UNITED STATES PATENT OFFICE.

FRANCIS J. GAY, OF PROVIDENCE, RHODE ISLAND, ASSIGNOR OF ONE-HALF TO LAROY S. STARRETT, OF ATHOL, MASSACHUSETTS.

CUTTER FOR GEAR-WHEELS.

SPECIFICATION forming part of Letters Patent No. 511,607, dated December 26, 1893.

Application filed September 27, 1893. Serial No. 486,609. (No model.)

*To all whom it may concern:*

Be it known that I, FRANCIS J. GAY, a citizen of the United States, residing at Providence, in the county of Providence and State of Rhode Island, have invented certain new and useful Improvements in Cutters for Gear-Wheels, &c.; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in toothed cutters for gear-wheels, &c., and it consists essentially in providing the heel portion of the cutter teeth with a central line or indentations, whereby the exact central plane of the cutter can be quickly and accurately set with relation to a gage point or the axis of the wheel-carrying spindle of the gear-cutting machine.

In one form of toothed cutter hitherto used the outer periphery of the teeth has been provided centrally with a gage line, said line being slightly elevated, thus forming a ridge; in some cases, however, the line is really a fine groove. There are objections to such former construction; for example, in using a cutter having a central exterior rib there is produced its counterpart in the work cut in the form of a corresponding groove, which is undesirable; moreover, the rib is liable to break, or crumble as it is termed, thus making the line unreliable. When cutters are employed having a central groove, in lieu of the rib, it results in producing a corresponding rib or projection on the surface of the work acted upon by the cutter; another objection to the last-named cutter is that in use the metal at the sides of the groove quickly wears or breaks away thus seriously affecting the efficiency and durability of the cutter.

The object I seek to attain is to produce a cutter devoid of the disadvantages inherent in cutters having a central gage-line or mark constructed as just described.

In my improved cutter neither the working faces nor the peripheries of the teeth are provided with a gage-line or mark. Consequently no disfigurement of the work results from the use of said cutter.

By means of my improvement the workman or mechanic is enabled to adjust the relation of the cutter to the work with greater facility and accuracy.

In the accompanying sheet of drawings, Figure 1 is a perspective view of a gear-wheel cutter embodying my improvement. Fig. 2 is an enlarged transverse sectional view, taken on line $x\,x$ of Fig. 1, showing the rear face portion of one of the cutter teeth. Fig. 3 is a similar sectional view, showing a modified form of the gage-mark, and Fig. 4 is a cross-sectional view, taken on line $o\,o$ of Fig. 1, showing the front or cutting face of one of the cutter teeth.

In the drawings $a$ indicates my improved cutter for gear-wheels, &c.; the same being constructed and adapted for operation substantially as common to cutters of this class, except as to the central gage-mark. As is well-known rotary or milling cutters are usually made of steel, the same being subsequently suitably hardened and tempered. The peripheral surface $p$ of the several teeth $c$ is not, as a rule, concentric with the arbor-hole $h$ of the cutter, but is cut away or eccentric as common. The front of working face $c'$ of each tooth is practically radial, and if continued would intersect the center of the cutter. The rear face $c^2$ or heel of the tooth is when new substantially parallel with the forward or cutting face $c'$. Therefore the rear face is tangential. This last-named face, $c^2$, is never ground, and as all the work is borne by the opposite face of the tooth it follows that the tooth will be gradually made shorter circumferentially. Consequently the working face will recede correspondingly, and any marks originally made thereon become obliterated.

From the statement just made it will be apparent that a mark made upon the rear faces $c^2$ of the teeth will remain permanently, or during the entire time the cutter is kept in service. Furthermore, it is found that by locating the gage-mark on the rear faces of the teeth the workman can align the cutter with the work more readily and easily; in view of these considerations I provide the rear faces $c^2$ of one or more of the teeth $c$ with a mark or line $b$ located in an imaginary plane passing through the cutter centrally of its width, as shown in Figs. 1 and 2. In lieu of a continuous line the gage-mark may consist of a series of dots or indentations $b'$ located along said central plane, as shown in Fig. 3. I prefer, as a matter of expediency, to extend the line or indentations nearly to the periphery $p$ of the teeth; the opposite end of the line may run to the root of the tooth and along the base to the root of the adjacent tooth, as at $b^2$, Fig. 1.

In Fig. 4 I have represented the working face $c'$ of the cutter tooth having its peripheral surface $p$ provided with a slight groove $m$, as hitherto made.

I would further state that by locating the mark on the rear face of the teeth it can be made quite deep and prominent since it does not interfere with the cutting edges of the teeth nor with the perfect working of the cutter; when thus made the mark is not only more plainly seen but it admits of the use of an indicator point, thereby providing a way to mechanically test the truth of the cutter with greater facility and accuracy than could otherwise be done. Owing to the said location of the mark the polishing of the rear faces of the thus marked teeth will make the line or mark more prominent or conspicuous.

I claim as my invention—

1. A toothed cutter having the rear faces of the teeth provided with a central gage-line or mark, substantially as described and for the purpose set forth.

2. A toothed cutter of the class hereinbefore described having the rear face of one or more of its teeth provided with a central gage-mark or indentations not extending to the periphery $p$ of the teeth, substantially as set forth.

In testimony whereof I have affixed my signature in presence of two witnesses.

FRANCIS J. GAY.

Witnesses:
GEO. H. REMINGTON,
IDA M. WARREN.